(12) United States Patent
Lee et al.

(10) Patent No.: US 11,415,556 B2
(45) Date of Patent: Aug. 16, 2022

(54) ACOUSTIC WAVE SUPERSCATTERING

(71) Applicant: Toyota Motor Engineering & Manufacturing North America, Inc., Plano, TX (US)

(72) Inventors: Taehwa Lee, Ann Arbor, MI (US); Hideo Iizuka, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 611 days.

(21) Appl. No.: 16/510,335

(22) Filed: Jul. 12, 2019

(65) Prior Publication Data
US 2021/0010977 A1 Jan. 14, 2021

(51) Int. Cl.
*G01N 29/07* (2006.01)
*G01N 21/17* (2006.01)

(52) U.S. Cl.
CPC ......... *G01N 29/07* (2013.01); *G01N 21/1702* (2013.01)

(58) Field of Classification Search
CPC .. G01N 29/07; G01N 29/2487; G01N 29/221; G01N 29/14; G01N 29/26; G01N 21/1702
See application file for complete search history.

(56) References Cited

U.S. PATENT DOCUMENTS

| 4,548,292 A | 10/1985 | Noxon |
| 8,955,643 B2 | 2/2015 | Liu |
| 2002/0064341 A1* | 5/2002 | Fauver ............. G02B 6/3502 359/210.1 |
| 2005/0140465 A1* | 6/2005 | Hwu .................. H03H 9/0211 333/187 |
| 2017/0206884 A1 | 7/2017 | Degrandis et al. |

FOREIGN PATENT DOCUMENTS

CN 106205590 A 12/2016

OTHER PUBLICATIONS

Ruan et al., "Superscattering of Light from Subwavelength Nanostructures", Physical Review Letters 105, Jul. 2, 2010 (4 pages).
Zhang et al., "Tunable directional subwavelength acoustic antenna based on Mie resonance", Scientific Reports, Published Jul. 3, 2018 (8 pages).
Qian et al., "Experimental observation of superscattering", Physical Review Letters 122, Published Feb. 11, 2019 (13 pages).
Cheng et al., "Ultra-sparse metasurface for high reflection of low-frequency sound based on artificial Mie resonances", Nature Materials, Published Aug. 31, 2015 (8 pages).

* cited by examiner

*Primary Examiner* — Suman K Nath
(74) *Attorney, Agent, or Firm* — Christopher G. Darrow; Darrow Mustafa PC

(57) ABSTRACT

A device can be configured to cause the superscattering of acoustic waves and/or to enable incident angle-dependent scattering. The acoustic superscattering device can include a body that has an outer peripheral surface. One or more resonators can be defined in the body. The one or more resonators can open to the outer peripheral surface of the body. When there are a plurality of resonators, the resonators are not in communication with each other within the body. The acoustic superscattering device can be configured to cause the superscattering of a target acoustic wave impinging upon the body.

20 Claims, 4 Drawing Sheets

ACOUSTIC WAVE SUPERSCATTERING

FIELD

The subject matter described herein relates in general to acoustic waves and, more particularly, to the scattering of acoustic waves.

BACKGROUND

Scattering is a fundamental interaction between objects and incident acoustic waves. Generally, scattering is a phenomenon in which acoustic waves deviate from a path due to localized non-uniformities in the medium through which they pass. For instance, non-resonant scatterers can scatter incident waves by their physical dimension. Acoustic wave scattering can be used in various applications, such as medical ultrasound or acoustic tiling.

SUMMARY

In one respect, the present disclosure is directed to a device for superscattering a target acoustic wave. The device can include a body. The body can have an outer peripheral surface. A plurality of resonators can be defined in the body. The plurality of resonators can open to the outer peripheral surface of the body. The plurality of resonators are not in communication with each other within the body. The plurality of resonators can be configured to cause the superscattering of a target acoustic wave impinging upon the body.

In another respect, the present disclosure is directed to a system for acoustic superscattering a target acoustic wave. The system can include an acoustic superscattering device. The device can be configured for superscattering a target acoustic wave. The device can include a body. The body can have an outer peripheral surface. A plurality of resonators can be defined in the body. The plurality of resonators can open to the outer peripheral surface of the body. The plurality of resonators are not in communication with each other within the body. The plurality of resonators can be configured to cause the superscattering of a target acoustic wave impinging upon the body. The system can further include an acoustic sensor located within one of the resonators defined in the body.

DETAILED DESCRIPTION

Figure 1:
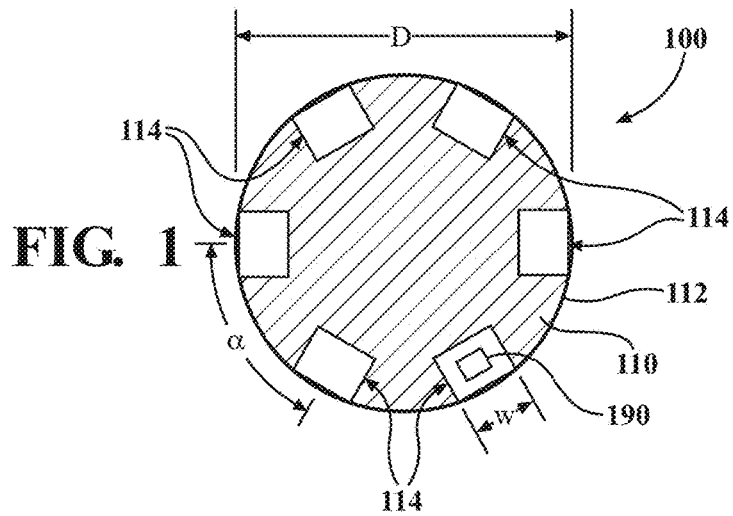
FIG. 1 is a cross-sectional view of an example of an acoustic superscattering device.

Arrangements described herein are directed to the superscattering of acoustic waves. An acoustic superscattering device described herein can cause acoustic waves to scatter with an extremely large cross section. An acoustic superscattering device described herein can enable incident angle-dependent scattering. The acoustic superscattering device can include a body that has an outer peripheral surface. One or more resonators can be defined in the body. The one or more resonators can open to the outer peripheral surface of the body. When there are a plurality of resonators, the resonators are not in communication with each other within the body. The acoustic superscattering device can be configured to cause the superscattering of a target acoustic wave impinging upon the body.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIG. 1 shows a cross-sectional view of an example of an acoustic superscattering device 100. As used herein, superscattering can refer to an acoustic wave scattering cross section that is substantially larger than the cross sectional size of the acoustic superscattering device. For instance, superscattering can refer to a ratio of an acoustic wave scattering cross section to an acoustic superscattering device cross section of at least about 4:1, at least about 5:1, at least about 6:1, at least about 7:1, at least about 8:1, at least about 9:1, or at least about 10:1. Alternatively or additionally, superscattering can refer to an acoustic wave scattering cross section that is substantially larger than wavelength of an acoustic wave. For instance, superscattering can refer to a ratio of an acoustic wave scattering cross section to a wavelength of an acoustic wave of at least about 3:1, at least about 4:1, or at least about 5:1.

The device 100 can include a body 110. The body 110 can be made of any suitable material, such as plastic, metal, or glass. The body 110 can be formed in any suitable manner. The body 110 can have any suitable shape. For instance, the body 110 can be substantially spherical or substantially cylindrical. In some arrangements, the body 110 can be oval, polygonal, triangular, rectangular, or other shape. The body 110 can have an outer peripheral surface 112. In at least some arrangements, when the body 110 has a substantially circular cross-sectional shape, the outer peripheral surface 112 can have an associated diameter (D). In other arrangements, when the body does not have a substantially circular cross-sectional shape, the outer peripheral surface 112 can have an associated widthwise dimension. The diameter (D) can be smaller than the wavelength ($\lambda$) of a target acoustic wave.

The acoustic superscattering device 100 can include one or more resonators 114. The resonator(s) 114 are generally represented in FIG. 1 because the resonator(s) 114 can be any of a number of different types of resonators, some examples of which will be described herein. The resonator(s) 114 can be defined at least in part by the body 110. The resonator(s) 114 can open to the outer peripheral surface 112 of the body 110. However, there is no acoustic and/or fluid communication between the resonator(s) 114 within the body 110.

The resonator(s) 114 can have a width (w). The width (w) can be substantially smaller than the diameter (D) or, in the case of resonators with non-circular cross sectional shapes, some other widthwise dimension of the body 110.

There can be any number of resonators 114. The number can depend on the intended application. In some arrangements, there can be a single resonator 114. In other arrangements, there can be a plurality of resonators 114. For instance, there can be from two to eight resonators 114. In some arrangements, there can be more than eight resonators 114.

When the acoustic superscattering device 100 includes a plurality of resonators 114, the plurality of resonators 114 can be distributed in any suitable manner about the acoustic superscattering device 100. Neighboring resonators 114 can have any suitable angle $\alpha$ between them. In one or more arrangements, the plurality of resonators 114 can be substantially equally spaced about the acoustic superscattering device 100. In the example of FIG. 1 with six resonators 114, neighboring resonators 114 can be spaced at about 60 degrees relative to each other. In other arrangements, one or more resonators 114 of the plurality of resonators 114 can be non-equally spaced relative to the other resonators. In some arrangements, the resonators 114 can be aligned with each other on opposite sides of the body 110, as is shown in FIG. 1. However, one or more resonators 114 can be offset from other resonators 114.

The acoustic superscattering device 100 can be configured to cause the superscattering of a target acoustic wave impinging upon the acoustic superscattering device 100. The acoustic superscattering device 100 can be configured for a target acoustic wave by tuning the resonator(s) 114 to a target resonance frequency. For instance, the size, shape, and/or configuration of the resonator(s) 114 can be varied to achieve the desired target resonance frequency and/or superscattering performance.

Figure 2A:
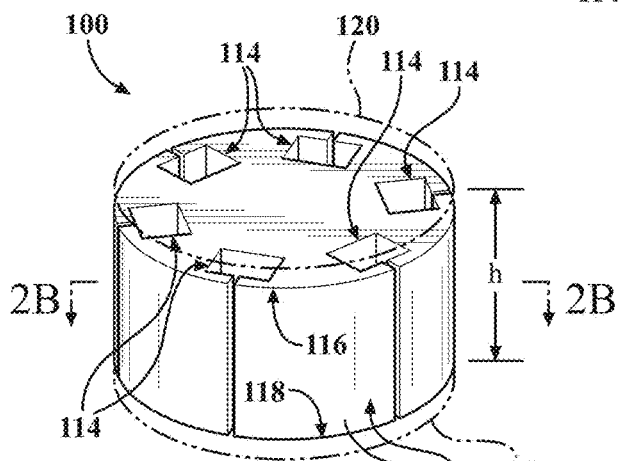
FIG. 2A is an example of an acoustic superscattering device including a plurality of Helmholtz resonators.
Figure 2B:
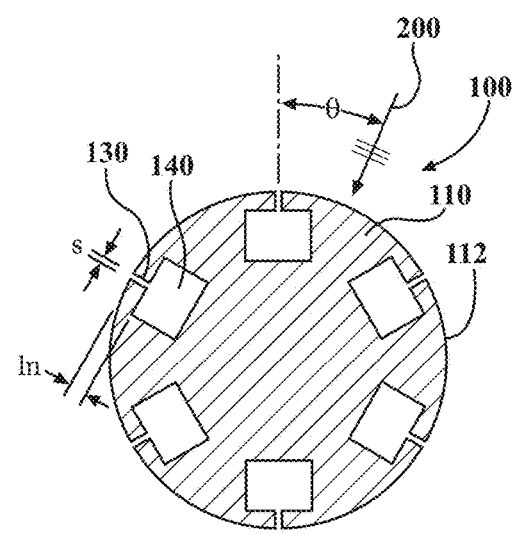
FIG. 2B is a cross-sectional view of the acoustic superscattering device of FIG. 2A, viewed along line 2B-2B in FIG. 2A.

Referring to FIGS. 2A-2B, an example of an acoustic superscattering device 100. The acoustic superscattering device 100 can be a subwavelength scatterer. The body 110 of the acoustic superscattering device 100 can be substantially cylindrical. The body 110 can have a height (h).

The body 110 can have a first end 116 and a second end 118. The first end 116 of the body 110 can include a first endcap 120. The second end 118 of the body 110 can include a second endcap 122. In some arrangements, the first endcap 120 and/or the second endcap 122 can be formed as a unitary structure with the body 110, such as by casting, machining, and/or three dimensional printing. In other arrangements, the first endcap 120 and/or the second endcap 122 can be formed separate from the body 110. In such case, the first endcap 120 and/or the second endcap 122 can be operatively connected to the body 110 in any suitable manner, such as by one or more fasteners, one or more adhesives, one or more welds, and/or one or more forms of mechanical engagement, just to name a few possibilities.

The acoustic superscattering device 100 can include a plurality of resonators 114. The resonators 114 can be substantially identical to each other. The resonators 114 can be substantially equally spaced from each other.

In this example, the acoustic superscattering device 100 can include six resonators 114. In this example, the resonators 114 can be Helmholtz resonators. The resonators 114 can include a neck 130 and a cavity 140. The neck 130 can have a width (s) and a length ($l_n$). The width (s) of the neck 130 can be narrow relative to a width of the cavity 140. The neck 130 can have any suitable shape. In this example, the neck 130 can be substantially rectangular in cross-sectional shape. The neck 130 can have an opening area (A). In the particular configuration shown in FIGS. 2A-2B, the opening area (A) can be determined by: A=s*h. The cavity 140 can have a volume (V), which can be determined as appropriate depending on the geometry of the cavity 140. The cavity 140 can have any suitable shape. In this example, the cavity 140 can be substantially rectangular prismatic in shape. The resonance frequency (f) of the resonators 114 can be determined by $f=c/2\pi*(A/l_n V)^{1/2}$. In this equation, c is the speed of sound. As is shown in FIG. 2B, acoustic waves 200 can be incident on the acoustic superscattering device 100 at an angle $\theta$ with respect to one of the resonators 114.

Figure 3A:
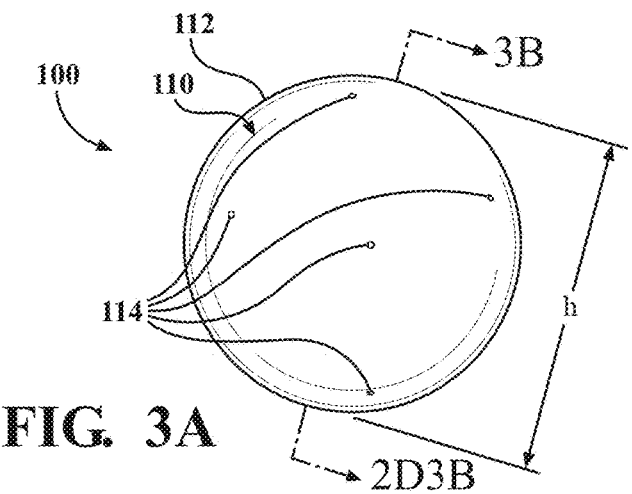
FIG. 3A is another example of an acoustic superscattering device including a plurality of Helmholtz resonators.
Figure 3B:
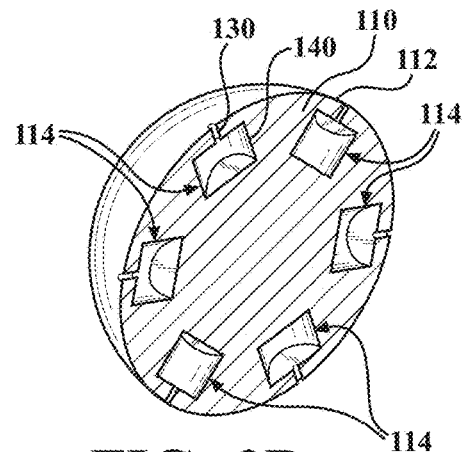
FIG. 3B is a cross-sectional view of the acoustic superscattering device of FIG. 3A, viewed along line 3B-3B in FIG. 3A.

Referring to FIGS. 3A-3B, another example of an acoustic superscattering device 100 is shown. The acoustic superscattering device 100 can be a subwavelength scatterer. The body 110 of the acoustic superscattering device 100 can be substantially spherical. The body 110 can have a height (h), which, in the resonator configuration of FIGS. 3A-3B, can be equal to the diameter of the body 110.

The acoustic superscattering device 100 can include a plurality of resonators 114. The resonators 114 can be substantially identical to each other. The resonators 114 can be substantially equally spaced from each other. In this example, the resonators 114 can be Helmholtz resonators. The resonators 114 can include a neck 130 and a cavity 140. The neck can have a width (s) and a length ($l_n$). The width (s) of the neck 130 can be narrow relative to a width of the cavity 140. In this example, the neck 130 can be substantially circular in cross-sectional shape. The neck can have an opening area (A), which can be determined in this configuration by: $A=\pi s^2/4$. The cavity 140 can have a volume (V), which can be determined as appropriate depending on the geometry of the cavity 140. The cavity 140 can have any suitable shape. In this example, the cavity 140 can be substantially cylindrical in shape. The resonance frequency (f) of the resonators 114 can be determined by $f=c/2\pi*(A/l_n V)^{1/2}$. In this equation, c is the speed of sound.

In some arrangements, the plurality of resonators 114 can be substantially identical to each other, as is shown above in connection with FIGS. 2A-2B and 3A-3B. In such arrangements, each of the plurality of resonators 114 can be configured for the same target resonance frequency. However, in other arrangements, the target resonance frequency of one or more of the resonators 114 can be slightly de-tuned by adjusting the size of the cavity 140 and/or the size of the neck 130.

Figure 4:
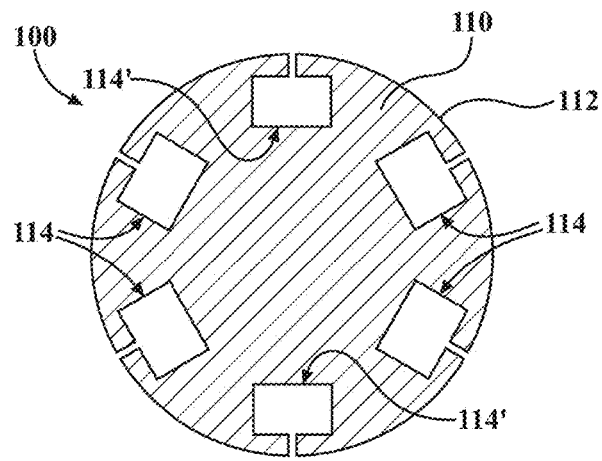
FIG. 4 is a cross-sectional view of an example of an acoustic superscattering device with non-identical resonators.

One example of such an arrangements is shown in FIG. 4, which shows a cross-sectional view of an example of an acoustic superscattering device 100 with non-identical resonators. In this particular arrangement, two of the resonators 114' can be detuned by reducing their cavity size. These resonators 114' can be substantially identical to each other. The detuned resonators 114' can have any suitable spatial relationship relative to each other. In some instances, they can be opposite each other, as is shown in FIG. 4. However, in other instances, the resonators 114' can be neighboring resonators, or they resonator 114' can be offset from each other.

While the arrangements in FIGS. 2-4 are directed to acoustic superscattering devices that include Helmholtz type resonators, it will be appreciated that acoustic superscattering devices according to arrangements herein can include other types of resonators. Various examples of other types of resonators will be described below.

Figure 5A:
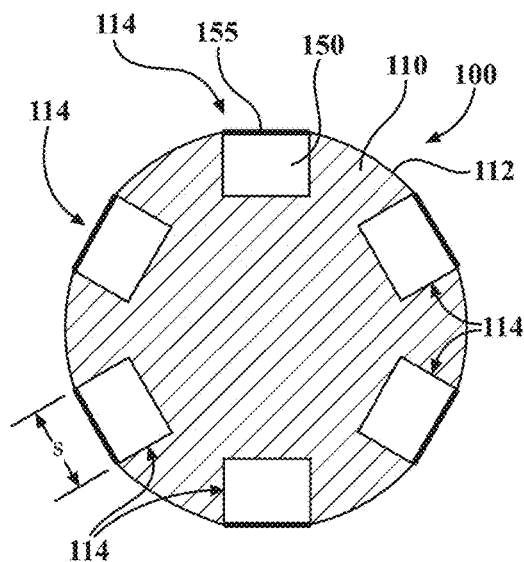
FIG. 5A is an example of an acoustic superscattering device including a plurality of membrane-type resonators.

In one or more arrangements, the resonators 114 can be membrane type resonators. The resonators 114 can be any suitable type of membrane type resonators, now known or later developed. An example of a membrane type resonator is shown in FIG. 5A. The membrane type resonators can include a cavity 150 defined in the body 110. The cavity 150 can open to the outer peripheral surface 112 of the body 110. The open end of the cavity 150 can be closed using a membrane 155. The membrane 155 can be made of a thin, elastic material. In some arrangements, the cavity 150 can be filled with a gas backing, such as air or other gas. The membrane type resonators are not in acoustic and/or fluid communication with each other within the body 110.

Figure 5B:
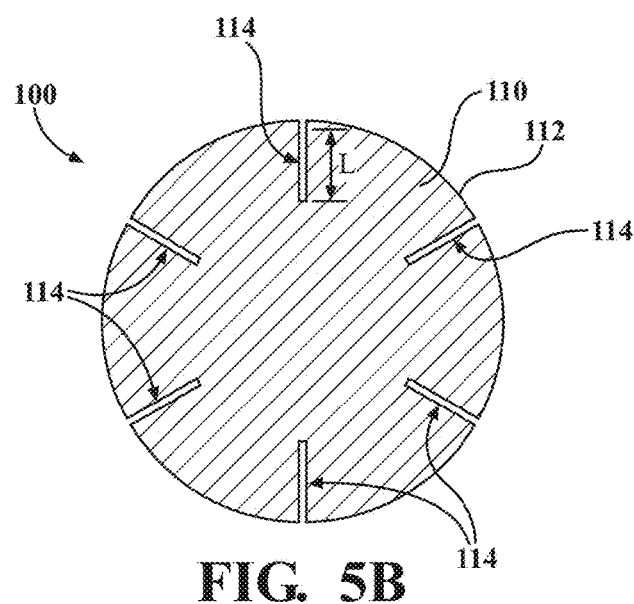
FIG. 5B is an example of an acoustic superscattering device including a plurality of quarter wavelength resonators defined by substantially straight channels.
Figure 5C:
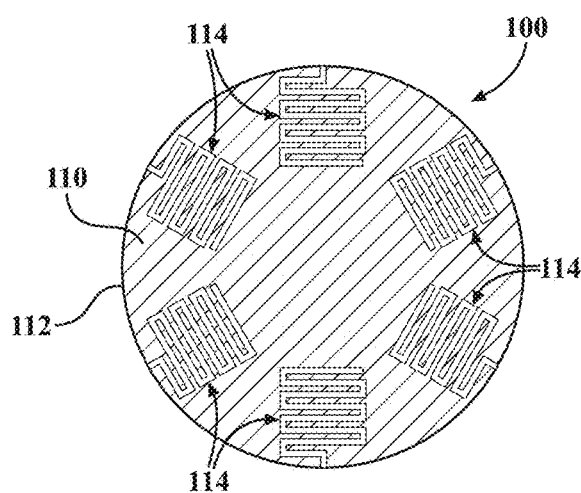
FIG. 5C is an example of an acoustic superscattering device including a plurality of quarter wavelength resonators defined by substantially serpentine channels.

As an example, in one or more arrangements, the resonators 114 can be quarter wavelength resonators. The resonators 114 can be any suitable type quarter wavelength resonators, now known or later developed. Examples of quarter wavelength resonators are shown in FIGS. 5B-5C. FIG. 5B is an example of a quarter wavelength resonator defined by a substantially straight channel. The quarter wavelength resonators can extend a distance (L) within the body 110. FIG. 5C is an example of a quarter wavelength resonators as defined by a coiled or serpentine channel. In these arrangements, the quarter wavelength resonator can open to the outer peripheral surface 112 of the body 110. The quarter wavelength resonators are not in fluid and/or acoustic communication with each other within the body 110.

Figure 6A:
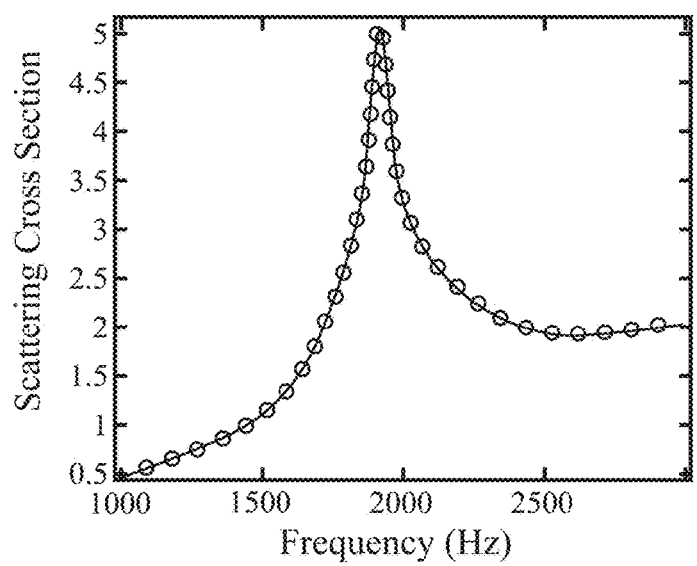
FIGS. 6A-6C show the acoustic scattering performance of the acoustic superscattering device of FIGS. 2A-2B.
Figure 6B:
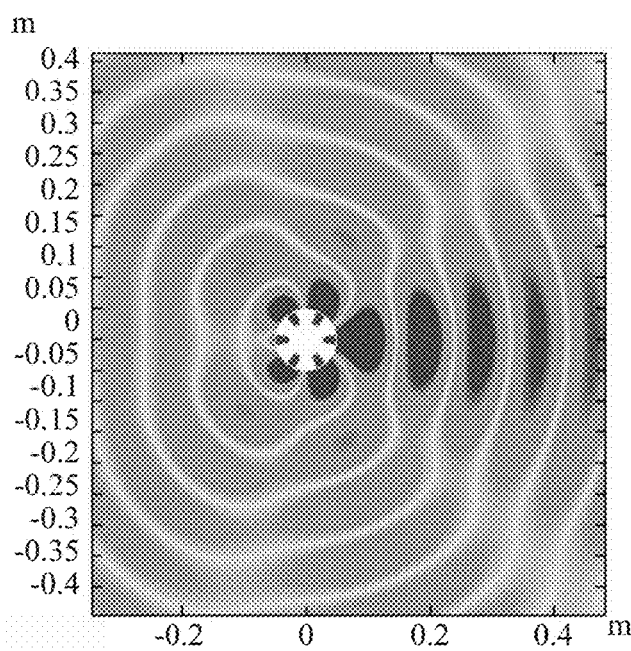
Figure 6C:
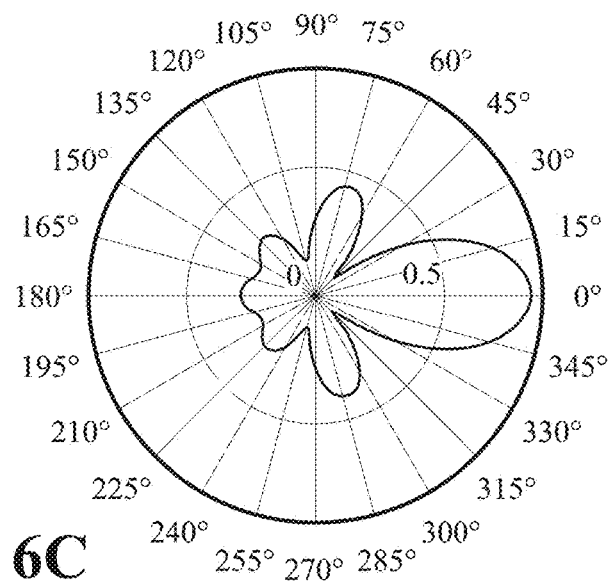

FIGS. 6A-6C show the acoustic scattering performance of the acoustic superscattering device 100 of FIGS. 2A-2B. In particular, FIG. 6A shows acoustic scattering cross section spectrum of the acoustic superscattering device 100 of FIG. 2A. In this figure, the acoustic scattering cross section spectrum is normalized to $2\lambda/\pi$, where $\lambda$ is the wavelength. Also, the incident angle $\theta$ of the target acoustic wave is 0 degrees. The peak scattering cross section reaches about 5 at about 1900 Hz. FIG. 6B shows the scattered acoustic amplitude of the pressure field surrounding the acoustic superscattering device 100 at 1920 Hz. FIG. 6C shows acoustic amplitudes observed at different locations of the acoustic superscattering device 100.

Figure 7:
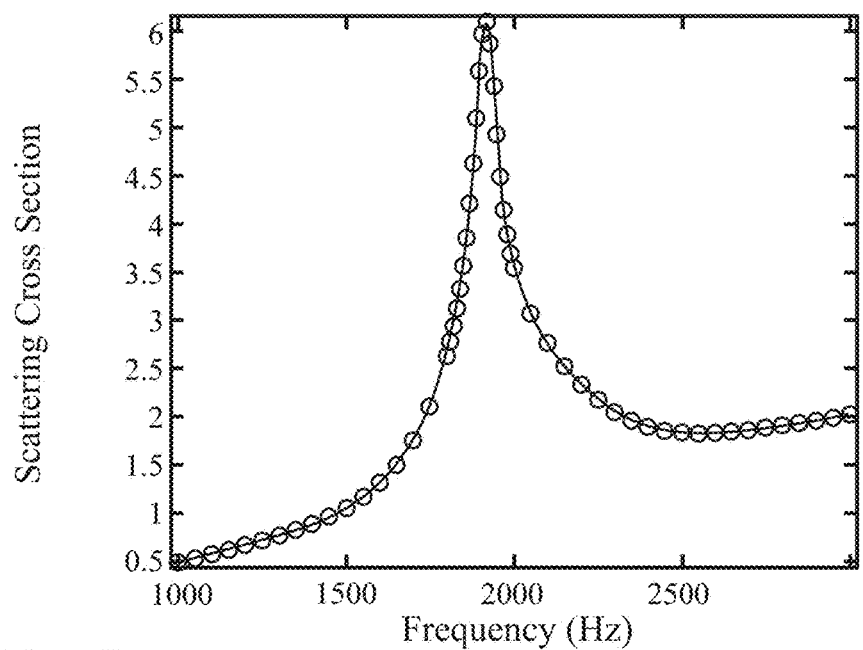
FIG. 7 shows the scattering cross-section relative to frequency for the acoustic superscattering device of FIG. 4.

FIG. 7 shows the scattering cross-section relative to frequency for the acoustic superscattering device of FIG. 4 with detuned resonators. Also, the incident angle $\theta$ of the target acoustic wave is 0 degrees. The peak scattering cross section reaches about 6 at about 1900 Hz. Thus, the scattering performance can be increased compared to the acoustic superscattering device of FIGS. 2A-2B.

Figure 8:
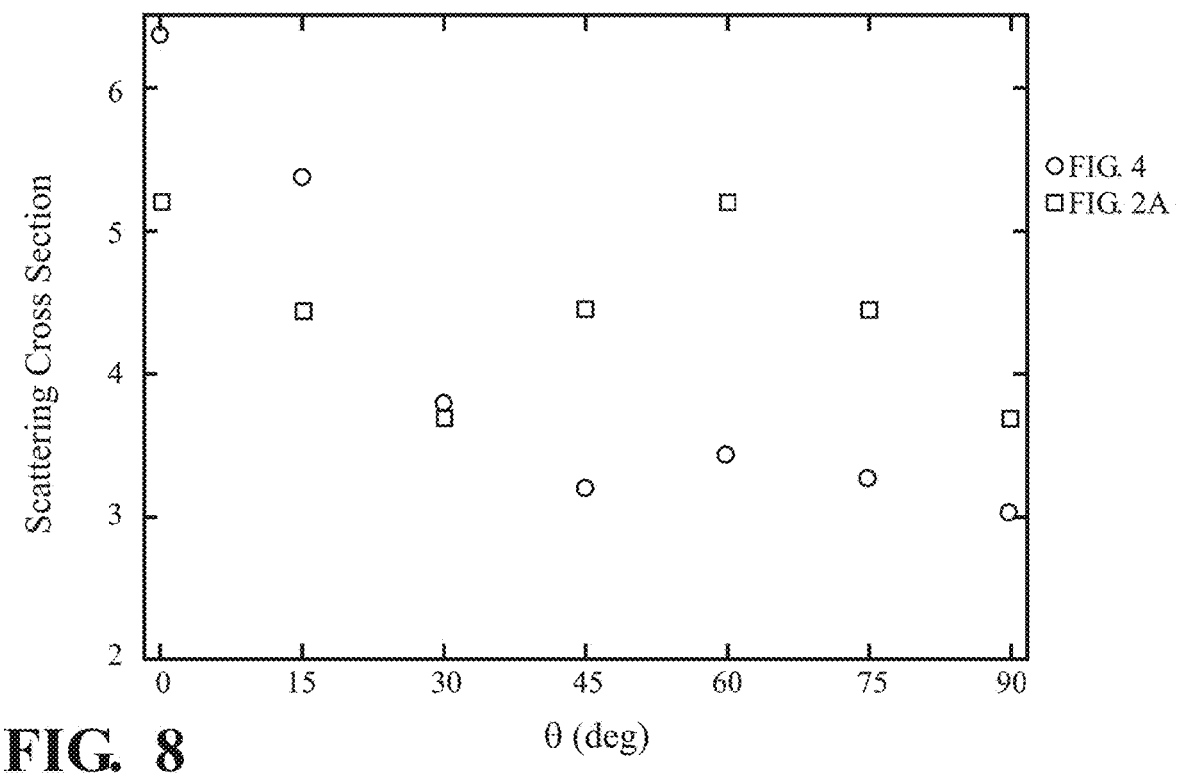
FIG. 8 shows the scattering cross-section relative to the incident angle for the acoustic superscattering devices of FIGS. 2A and 3.

FIG. 8 shows the scattering cross-section relative to the incident angle $\theta$ for the acoustic superscattering devices of FIG. 2A (substantially identical resonators) and FIG. 4 (detuned resonators). In particular, the acoustic superscattering device of FIG. 4 shows a large variation in scattering cross section depending on the incident angle $\theta$.

Arrangements described herein can be used in various settings and in various ways. Some non-limiting examples of the operation of the arrangements described herein will now be presented.

Arrangements described herein can be used in various automotive applications. For instance, arrangements described herein can be used in connection with a vehicle in situations to enhance the detection of other vehicles. For instance, a vehicle can have a rear sonar transmitter and an acoustic receiver or detector. This vehicle and other vehicles can include an acoustic superscattering device, as described herein. The acoustic superscattering device(s) can be provided in one or more locations on the vehicles.

There are situations in which it may be difficult for a vehicle to detect other vehicles, such as in a crowded parking lot. A first vehicle may be backing out of a parking space while a second vehicle is approaching the first vehicle from a transverse direction. The rear sonar of the first vehicle can transit acoustic waves into the external environment. When such acoustic waves impinge upon the acoustic superscattering device(s) of the second vehicle, a very large or super scattered cross section of the acoustic waves can be created. The acoustic detector of the first vehicle can detect the superscattered acoustic wave, which appears to be much larger than it otherwise would. Thus, the sensitivity of the acoustic sensors can be improved.

It should be noted that one or more acoustic sensors 190 (FIG. 1) can be located within one or more of the resonators 114 of the acoustic superscattering device 100. In one or more arrangements, an acoustic sensor 190 can be located within each resonator 114 of the acoustic superscattering device 100. By placing the acoustic sensor 190 within the resonator 114, the sensitivity of the acoustic sensor 190 can be increased. The acoustic sensor 190 can be operatively connected to one or more processors, one or more data stores, and/or one or more modules configured to analyze acoustic data acquired by the acoustic sensors 190.

As another example, arrangements described herein can be used in connection for noise suppression. For instance, arrangements described herein can be used in connection with a building or other structure to create a more quiet space. A plurality of acoustic superscattering devices, as described herein, can be distributed outside of the building. In some arrangements, the plurality of acoustic superscattering devices can be located at substantially the same distance away from the building. There can be any suitable spacing between the plurality of acoustic superscattering devices. In some arrangements, the plurality of acoustic superscattering devices can be substantially equally spaced apart. Because of their large scattering cross sections, the plurality of acoustic superscattering devices can collectively form a sound reflector. Thus, outside noise can be reflected away from the building and back toward the external environment. The plurality of acoustic superscattering devices can be configured to aesthetically blend in with the environment.

It will be appreciated that arrangements described herein can provide numerous benefits, including one or more of the benefits mentioned herein. For example, arrangements described herein can result in the superscattering of acoustic waves as well as incident angle-dependent scattering. According to arrangements described herein, superscattering can be realized with relatively simple structures and without using multilayer coatings. Arrangements described herein enable design flexibility, allowing various types of resonators to be used in connected with the acoustic superscattering device. The acoustic superscattering achieved by arrangements described herein can be desirable in various applications, such as acoustic sensing, acoustic particle levitation, and sparse noise barriers. Acoustic superscattering devices described herein can also be used in connection with acoustic sensors (detectors) or as a building block of acoustic metamaterials.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A device for superscattering a target acoustic wave, the device comprising:
   a body having an outer peripheral surface; and
   a plurality of resonators being defined in the body, the plurality of resonators opening to the outer peripheral surface of the body, the plurality of resonators not being in communication with each other within the body, the plurality of resonators being configured to cause the superscattering of the target acoustic wave impinging upon the body.

2. The device of claim 1, wherein a superscattered cross section of the target acoustic wave relative to a width of the body is at least about 4:1.

3. The device of claim 1, wherein the body has a diameter or a width, and wherein the diameter or the width is smaller than a wavelength of the target acoustic wave.

4. The device of claim 1, wherein each resonator has a width, wherein the body has a diameter or a width, and wherein the diameter or the width of the body is substantially larger than the diameter or the width of each resonator.

5. The device of claim 1, wherein the body is substantially spherical.

6. The device of claim 1, wherein the body is substantially cylindrical.

7. The device of claim 6, wherein the body include a first endcap and a second endcap on opposite sides of the body, and wherein the plurality of resonators are not open to an external environment of the device at the first endcap or the second endcap.

8. The device of claim 1, wherein the plurality of resonators are substantially equally spaced about the body.

9. The device of claim 1, wherein the plurality of resonators are substantially identical.

10. The device of claim 1, wherein one or more of the plurality of resonators are different than the other resonators.

11. The device of claim 10, wherein the resonators have a neck and a cavity, and wherein a volume of the cavity of the one or more of the plurality of resonators is different than a volume of the cavity of the other resonators.

12. The device of claim 1, wherein the plurality of resonators are Helmholtz resonators, the resonators including a neck in communication with a cavity, wherein the neck has a width and the cavity has a width, and wherein the width of the cavity is larger than the width of the neck.

13. The device of claim 1, wherein the plurality of resonators are quarter wavelength resonators, and wherein the plurality of resonators are defined by a substantially straight channel within the body.

14. The device of claim 1, wherein the plurality of resonators are quarter wavelength resonators, the plurality of resonators being defined by a serpentine channel within the body.

15. The device of claim 1, wherein the plurality of resonators are membrane-type resonators.

16. A system for acoustic superscattering a target acoustic wave, the system comprising:
   an acoustic superscattering device configured to superscatter the target acoustic wave, the acoustic superscattering device comprising:
      a body having an outer peripheral surface; and
      a plurality of resonators being defined in the body, the plurality of resonators opening to the outer peripheral surface of the body, the plurality of resonators not being in communication with each other within the body, the plurality of resonators being configured to cause the superscattering of a target acoustic wave impinging upon the body; and
   one or more acoustic sensors located within one or more of the plurality of resonators.

17. The system of claim 16, wherein a superscattered cross section of the target acoustic wave relative to a width of the body is at least about 4:1.

18. The system of claim 16, wherein one or more of the plurality of resonators are different than the other resonators.

19. The system of claim 16, wherein the plurality of resonators are Helmholtz resonators.

20. The system of claim 16, wherein the body has a diameter or a width, and wherein the diameter or the width is smaller than a wavelength of the target acoustic wave.

* * * * *